(12) United States Patent
Bai et al.

(10) Patent No.: US 11,448,950 B2
(45) Date of Patent: Sep. 20, 2022

(54) COMBINATION WHEEL FOR LIGHT CONVERSION INCLUDING BOTH PHOSPHOR SEGMENTS AND COLOR FILTERS

(71) Applicant: MATERION PRECISION OPTICS (SHANGHAI) LIMITED, Shanghai (CN)

(72) Inventors: Shengyuan Bai, Shanghai (CN); James Li, Shanghai (CN); David Zhang, Shanghai (CN)

(73) Assignee: MATERION PRECISION OPTICS (SHANGHAI) LIMITED, Shanghai (CN)

( * ) Notice: Subject to any disclaimer, the term of this patent is extended or adjusted under 35 U.S.C. 154(b) by 0 days.

(21) Appl. No.: 16/486,609

(22) PCT Filed: Apr. 10, 2017

(86) PCT No.: PCT/CN2017/079874
§ 371 (c)(1),
(2) Date: Aug. 16, 2019

(87) PCT Pub. No.: WO2018/187897
PCT Pub. Date: Oct. 18, 2018

(65) Prior Publication Data
US 2019/0369472 A1    Dec. 5, 2019

(51) Int. Cl.
*G03B 21/20*   (2006.01)
*G02B 5/08*   (2006.01)
(Continued)

(52) U.S. Cl.
CPC ......... *G03B 21/204* (2013.01); *G03B 21/208* (2013.01); *G02B 5/08* (2013.01); *G02B 26/008* (2013.01); *G03B 33/08* (2013.01)

(58) Field of Classification Search
CPC ..................................................... G03B 21/204
See application file for complete search history.

(56) References Cited

U.S. PATENT DOCUMENTS

| 6,474,837 B1 | 11/2002 | Belliveau |
| RE40,015 E | 1/2008 | Belliveau |

(Continued)

FOREIGN PATENT DOCUMENTS

| CN | 2566230 Y | 8/2003 |
| CN | 202109406 U | 1/2012 |

(Continued)

OTHER PUBLICATIONS

International Search Report dated Jan. 15, 2018 from PCT/CN2017/079874.

(Continued)

*Primary Examiner* — Bao-Luan Q Le
(74) *Attorney, Agent, or Firm* — Tucker Ellis LLP

(57) ABSTRACT

A combination wheel is disclosed, which comprises a color filter, a reflective substrate coaxially aligned with and on a surface of the color filter, light-emitting phosphor segments of different colors on the reflective substrate, and a diffuser segment. When used with a blue laser generator and a series of a dichroic filters and mirrors, the combination wheel tunes and convert lights to be collected by a subsequent optical system.

20 Claims, 15 Drawing Sheets

(51) Int. Cl.
    *G02B 26/00*      (2006.01)
    *G03B 33/08*      (2006.01)

(56) References Cited

U.S. PATENT DOCUMENTS

| | | | | |
|---|---|---|---|---|
| 8,366,278 B2* | 2/2013 | Kurosaki | ............. | G03B 21/204 |
| | | | | 353/98 |
| 8,723,142 B2* | 5/2014 | Kurosaki | ................. | F21V 9/30 |
| | | | | 250/483.1 |
| 8,894,241 B2* | 11/2014 | Kitano | ................. | H04N 9/3114 |
| | | | | 345/208 |
| 9,432,640 B2* | 8/2016 | Chang | ................. | G02B 26/008 |
| 9,618,737 B2* | 4/2017 | Khan | ................. | G02B 26/008 |
| 9,631,792 B2* | 4/2017 | Hu | ................. | G02B 19/0047 |
| 9,851,071 B2* | 12/2017 | Hu | ......................... | G03B 21/28 |
| 9,880,453 B2* | 1/2018 | Huang | ................. | G03B 21/204 |
| 9,904,158 B2* | 2/2018 | Hu | ................. | H04N 9/3114 |
| 10,042,240 B2* | 8/2018 | Hu | ................. | G03B 21/2066 |
| 10,073,334 B2* | 9/2018 | Hu | ......................... | F21S 10/007 |
| 10,101,643 B2* | 10/2018 | Zhao | ................. | G03B 33/08 |
| 10,365,552 B2* | 7/2019 | Hu | ......................... | F21K 9/64 |
| 10,416,442 B2* | 9/2019 | Gao | ................. | G03B 33/08 |
| 10,459,324 B2* | 10/2019 | Zhao | ................. | G03B 21/204 |
| 10,539,298 B2* | 1/2020 | Hu | ......................... | G03B 33/08 |
| 11,340,445 B2* | 5/2022 | Nishikawa | ........... | G03B 21/208 |
| 11,343,476 B2* | 5/2022 | Yu | ................. | G03B 21/204 |
| 2010/0328632 A1* | 12/2010 | Kurosaki | ............... | G03B 21/28 |
| | | | | 353/98 |
| 2012/0242912 A1* | 9/2012 | Kitano | ................. | H04N 9/3114 |
| | | | | 348/759 |
| 2013/0088471 A1* | 4/2013 | Kitano | ................. | G03B 21/2073 |
| | | | | 345/208 |
| 2013/0114044 A1* | 5/2013 | Inoue | ................. | G03B 21/204 |
| | | | | 353/31 |
| 2013/0229634 A1* | 9/2013 | Hu | ............................. | F21V 9/38 |
| | | | | 353/84 |
| 2013/0258639 A1* | 10/2013 | Hu | ............................. | F21V 9/30 |
| | | | | 362/84 |
| 2013/0271954 A1* | 10/2013 | Li | ......................... | G03B 33/08 |
| | | | | 362/84 |
| 2013/0314670 A1* | 11/2013 | Huang | ................. | G03B 21/204 |
| | | | | 353/7 |
| 2014/0118991 A1* | 5/2014 | Lin | ................. | G03B 21/204 |
| | | | | 362/84 |
| 2014/0176914 A1* | 6/2014 | Mueller | ............... | G02B 26/008 |
| | | | | 353/31 |
| 2014/0211169 A1* | 7/2014 | Kitano | ................. | H04N 9/3161 |
| | | | | 353/31 |
| 2014/0226306 A1* | 8/2014 | Khan | ................. | H04N 9/3158 |
| | | | | 362/84 |
| 2015/0124429 A1* | 5/2015 | Hoehmann | ........... | G02B 26/008 |
| | | | | 362/84 |
| 2015/0354787 A1* | 12/2015 | Chang | ................. | G03B 33/08 |
| | | | | 362/84 |
| 2016/0041457 A1* | 2/2016 | Oh | ................. | G03B 21/204 |
| | | | | 353/31 |
| 2016/0105651 A1* | 4/2016 | Wang | ................. | G03B 21/2066 |
| | | | | 353/31 |
| 2016/0109789 A1* | 4/2016 | Zhao | ................. | G02B 26/008 |
| | | | | 362/84 |
| 2016/0274446 A1* | 9/2016 | Tanaka | ................. | G03B 21/204 |
| 2017/0242241 A1* | 8/2017 | Nojima | ................. | G02B 26/008 |
| 2017/0242325 A1* | 8/2017 | Hu | ................. | G03B 21/204 |
| 2017/0242326 A1* | 8/2017 | Hu | ................. | G02B 19/0028 |
| 2017/0242327 A1* | 8/2017 | Hu | ................. | G03B 21/204 |
| 2018/0024424 A1* | 1/2018 | Hu | ................. | F21V 29/502 |
| | | | | 362/322 |
| 2018/0172978 A1* | 6/2018 | Hu | ......................... | G03B 21/204 |
| 2018/0188640 A1* | 7/2018 | Huang | ................. | F21V 14/08 |
| 2018/0195689 A1* | 7/2018 | Hu | ......................... | G03B 21/14 |
| 2019/0025684 A1* | 1/2019 | Zhao | ................. | G03B 21/204 |
| 2019/0094522 A1* | 3/2019 | Gao | ................. | G03B 21/204 |
| 2019/0171094 A1* | 6/2019 | Hu | ................. | G03B 21/2066 |
| 2020/0110329 A1* | 4/2020 | Hu | ......................... | G03B 21/204 |
| 2021/0116698 A1* | 4/2021 | Nishikawa | ........... | G03B 21/208 |
| 2022/0075177 A1* | 3/2022 | Dai | ................. | H04N 9/3158 |
| 2022/0075245 A1* | 3/2022 | Kang | ................. | G03B 33/08 |

FOREIGN PATENT DOCUMENTS

| | | |
|---|---|---|
| CN | 102566230 A | 7/2012 |
| CN | 105045025 A | 11/2015 |
| CN | 204759006 U | 11/2015 |
| CN | 105222001 A | 1/2016 |
| CN | 105353578 A | 2/2016 |
| CN | 105762239 A | 7/2016 |
| CN | 205608228 U | 9/2016 |
| EP | 2650593 | 10/2013 |
| JP | 2008052070 A | 3/2008 |
| JP | 2011013313 A | 1/2011 |
| JP | 2012212129 A | 11/2012 |
| JP | 2013092752 A | 5/2013 |
| JP | 2018525655 A | 9/2018 |
| TW | 201629579 A | 5/2016 |

OTHER PUBLICATIONS

Japanese Office Action from corresponding Japanese Application No. 2020-504754, dated Mar. 4, 2021, 4 pages.
Supplementary European Search Report dated Jan. 15, 2021; 9 pages; Appl. No. 17905688.2-1020 / 3610325; PCT/CN2017/079874.
Search Report—dated Jan. 27, 2021; App. No. JP 2020-504754; 17 pages.

* cited by examiner

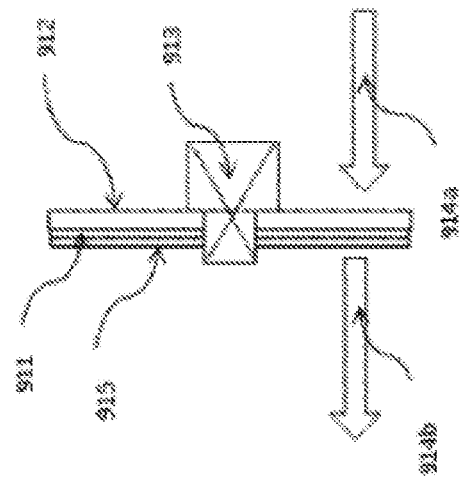
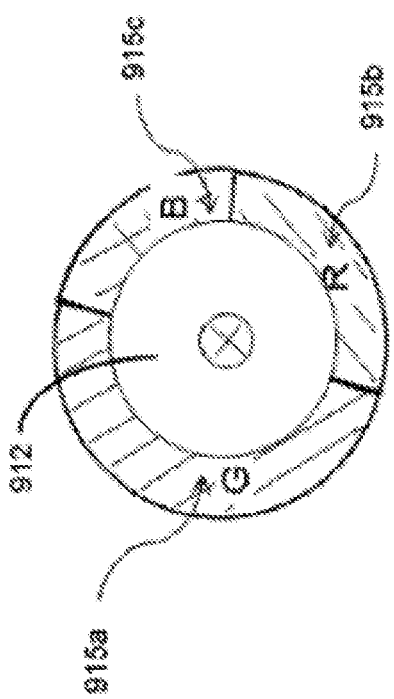
FIG. 9A (Prior Art)
FIG. 9B (Prior Art)

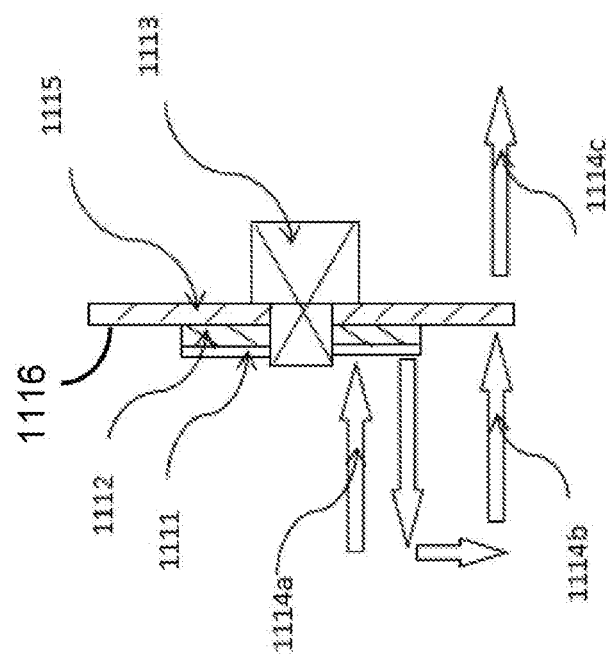
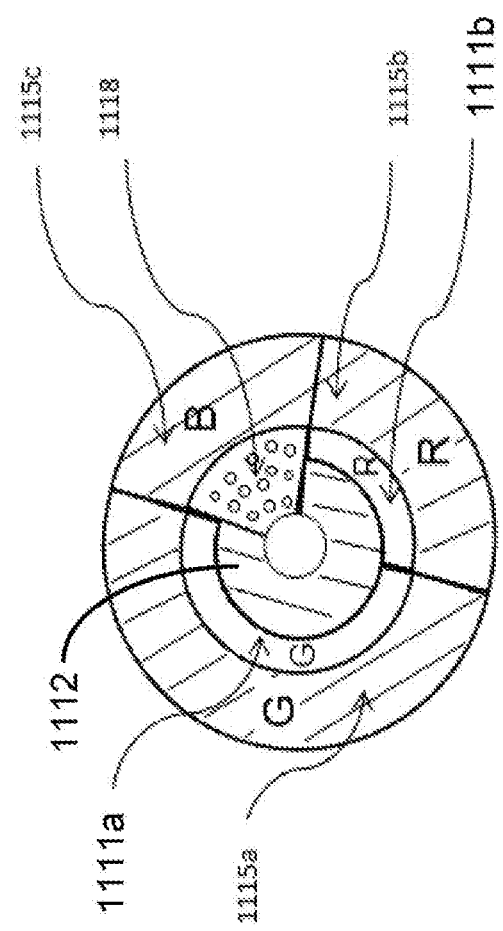
FIG. 11B
FIG. 11A

COMBINATION WHEEL FOR LIGHT CONVERSION INCLUDING BOTH PHOSPHOR SEGMENTS AND COLOR FILTERS

This application is a 371 of PCT Patent Application Serial No. PCT/CN2017/079874, filed Apr. 10, 2017.

BACKGROUND

The present disclosure relates to an optical light conversion device that integrates a color wheel and a phosphor wheel. The optical light conversion device can be used in, for example, a projection display system to generate color sequential illumination by wavelength conversion.

Phosphor wheels are used in a variety of optical devices such as projection-based or other picture generation systems using Digital Light Processing (DLP) technology. The phosphor wheel comprises a hub portion, which is a cylindrical body that acts as a rotor when coupled to a motor. An optically-active radial portion is attached to or integrated with the hub portion. Wavelength conversion materials (phosphors) on the optically-active radial portion generate emission light of a different wavelength from incident excitation light.

Current solid-state laser light sources (solid state illuminated, or SSI) use a blue laser to stimulate the phosphor wheel and generate the emission light, which may be green, yellow, or red depending on the phosphor powder. The monochromatic light waves are then mixed together to produce white light.

Although monochromatic light is produced by the phosphor wheel, phosphors usually cannot achieve the color gamut of a standard projector, i.e. the entire range of colors available on the projector. As a result, the colors must be tuned by a color filter. Generally, the color filter is also in the form of a wheel that rotates at a synchronous speed with the phosphor wheel. In a color wheel, the optically-active portion typically includes one or more color filters for filtering incident light. These are typically planar glass segments coated with a thin film in order to reflect or transmit light in a wavelength-dependent manner. Multiple color filters may be provided in different sections of the radial optically-active portion, so that rotation of the color wheel causes incident light to be affected differently by these different portions Typically, a phosphor wheel must be used together with a color wheel. It would be desirable to create an optical light conversion device that is operable with high-power sources, for example laser projectors, which overcomes the shortcomings of separate phosphor wheels and color wheels. In particular, it would be desirable to create an optical light conversion device that integrates the functions of a phosphor wheel and a color into a single structure, does not require more than current motor loading, achieves flexible color adjustment, can be made with fewer components, and uses low-cost components.

BRIEF DESCRIPTION

The present disclosure thus relates to a combination wheel, which can perform the function of both a phosphor wheel and a color wheel. Also disclosed herein are apparatuses comprising the combination wheel, a blue laser generator that produces an excitation blue light, and a series of a dichroic filters and mirrors used to tune and convert light to be collected by a subsequent optical system.

Disclosed in various embodiments herein are combination wheels, comprising: a color filter, a reflective substrate with at least two phosphor segments, and a diffuser segment. The color filter is segmented into at least three different colors. The reflective substrate is coaxially aligned with the color filter on a first surface of the color filter. The reflective substrate is in the form of a circle/cylinder with a wedge or sector removed. The reflective substrate can be described as having a central angle of less than 360°. A first light-emitting phosphor segment is deposited on a first sector of the reflective substrate. A second light-emitting phosphor segment deposited on a second sector of the reflective substrate. A diffuser segment is located adjacent the reflective substrate on the first surface of the color filter, and can be described as filling in the location where the wedge or sector was removed from the reflective substrate.

In particular embodiments, the first light-emitting phosphor segment includes a green light-emitting phosphor; and the second light-emitting phosphor segment includes a red or yellow light-emitting phosphor. Continuing, the first light-emitting phosphor segment is radially aligned with a green segment of the color filter; the second light-emitting phosphor segment is radially aligned with a red or yellow segment of the color filter, and the diffuser segment is radially aligned with a blue segment of the color filter.

In some embodiments, the reflective substrate is a high-reflectivity coating on the surface of the color filter. These embodiments could be considered a "single-substrate" wheel. In other embodiments, the reflective substrate is a reflective metal, such as aluminum or an aluminum alloy. Such embodiments could be considered a "dual-substrate" wheel. The color filter may comprise a glass substrate, with appropriate coatings thereon.

The combination wheel may further comprise a hub coupled to a motor, the color filter being coupled to the hub.

Also disclosed are apparatuses, comprising: a combination wheel as described herein; a blue laser generator that (A) produces an excitation blue light and (B) is aligned with the reflective substrate and the diffuser segment; a first dichroic filter located between the blue laser generator and the combination wheel, wherein blue light passes through the first dichroic filter and other-color light is reflected by the first dichroic filter; a first mirror located to redirect the other-color light from the first dichroic filter toward the color filter of the combination wheel, such that the other-color light passes through the color filter of the combination wheel and is tuned to produce tuned other-color light; and an optical system aligned to receive the tuned other-color light.

The apparatus may further comprise: a second dichroic filter located between the combination wheel and the optical system; and a second mirror; wherein the second dichroic filter and the second mirror are configured so that the tuned other-color light and the tuned blue light are directed toward the optical system.

In some embodiments, the second dichroic filter is located between the combination wheel and the optical system, wherein the tuned other-color light passes through the second dichroic filter and blue light is reflected by the second dichroic filter; and the second mirror is located to redirect blue light that passes through the diffuser segment of the combination wheel toward the second dichroic filter, so that the blue light is again reflected by the second dichroic filter toward the optical system.

In other embodiments, the second dichroic filter is located between the combination wheel and the optical system, wherein blue light passes through the second dichroic filter and other-color light is reflected by the second dichroic filter; and the second mirror is located to redirect the tuned other-color light toward the second dichroic filter, so that the tuned other-color light is again reflected by the second dichroic filter toward the optical system.

Also disclosed are combination wheels, comprising: a color filter segmented into at least two different colors and having a central angle of less than 360°; a reflective substrate coaxially aligned with the color filter on a first surface of the color filter; a first light-emitting phosphor segment deposited on a first sector of the reflective substrate; a second light-emitting phosphor segment deposited on a second sector of the reflective substrate; and a diffuser segment located adjacent the color filter and having a radius equal to a radius of the color filter. In these embodiments, the color filter is in the form of a circle/cylinder with a wedge or sector removed. The diffuser segment can be described as filling in the location where the wedge or sector was removed from the color filter.

The first light-emitting phosphor segment can include a green light-emitting phosphor; and the second light-emitting phosphor segment can include a red or yellow light-emitting phosphor. The first light-emitting phosphor segment may be radially aligned with a green segment of the color filter; and the second light-emitting phosphor segment may be radially aligned with a red or yellow segment of the color filter.

The reflective substrate may be a high-reflectivity coating. The color filter can be segmented into a green segment and a red or yellow segment. The color filter may comprise a glass substrate, with appropriate coatings thereon.

Apparatuses using this combination wheel also include a blue laser generator that (A) produces an excitation blue light and (B) is aligned with the reflective substrate and the diffuser segment; a first dichroic filter located between the blue laser generator and the combination wheel, wherein blue light passes through the first dichroic filter and other-color light is reflected by the first dichroic filter; a first mirror located to redirect the other-color light from the first dichroic filter toward the color filter of the combination wheel, such that the other-color light passes through the color filter of the combination wheel and is tuned to produce tuned other-color light; and an optical system aligned to receive the tuned other-color light. The apparatus may further comprise a blue color filter for tuning the excitation blue light to produce tuned blue light. The apparatus can also further comprise: a second dichroic filter located between the combination wheel and the optical system; and a second mirror; wherein the second dichroic filter and the second mirror are configured so that the tuned other-color light and the tuned blue light are directed toward the optical system. Such apparatuses are also described further above.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 9A is a plan view of a conventional sandwich-structure that combines a transmissive phosphor wheel with a color wheel. FIG. 9B is a side view showing the optical path therethrough.

FIG. 11A is a plan view of a first exemplary embodiment of a combination wheel of the present disclosure. This embodiment is a dual-substrate structure. FIG. 11B is a side cross-sectional view of the combination wheel, and also illustrates the optical path therethrough.

DETAILED DESCRIPTION

Figures 1A, 1B:
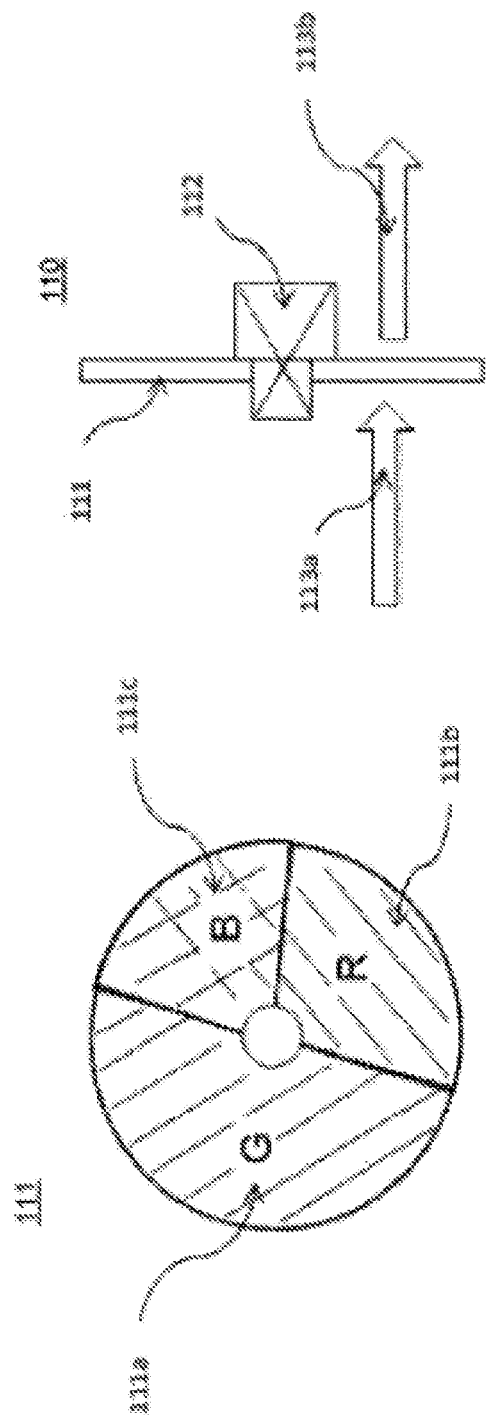
FIG. 1A is a plan view of a conventional RGB color wheel.
FIG. 1B is a side view showing the optical path therethrough.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

As used herein, the terms "excitation light" and "exciting light" are used to refer to input light, e.g. from a laser-based illumination source or other light source, and the terms "emission light" and "emitting light" are used herein to refer to converted reflected light from a color wheel.

For reference, the color red usually refers to light having a wavelength of about 780 nanometers to about 622 nanometers. The color green usually refers to light having a wavelength of about 577 nanometers to about 492 nanometers. The color blue usually refers to light having a wavelength of about 492 nanometers to about 455 nanometers. The color yellow usually refers to light having a wavelength of about 597 nanometers to about 577 nanometers. However, this may depend on the context. For example, these colors are sometimes used to label various parts and distinguish those parts from each other.

A dichroic filter, as used herein, refers to a filter that selectively passes light of a certain wavelength range while reflecting other light.

The present disclosure relates to combination wheels that serve the function of both a phosphor wheel and a color wheel, but that integrate those functions into a single structure that thus only requires one motor. This may permit the overall apparatus to be smaller in size. To explain how the combination wheel functions, it may be helpful to first review how conventional phosphor wheels and color wheels operate.

A conventional color wheel design is shown in FIG. 1A and FIG. 1B. An example of a known such color wheel design is shown in FIG. 1. A segment structure module 111 is separated into three (or more, if desired) segments by a dicing or scribble process. Here, the segment structure module 111 has three segments: a green segment 111a, a red segment 111b, and a blue segment 111c. This permits the color wheel to achieve the three primary (RGB) colors. In order to get a richer color, cyan, magenta, and yellow segments can be added, as well as a white segment to achieve a greater brightness when coordinated with a digital micromirror device (DMD). The segment structure module 111 is bonded to a motor 112, as shown in FIG. 1B, to produce the color wheel 110. As seen in FIG. 1B, incident light 113a passes through the segment structure module 111 to produce tuned light 113b.

Figure 2:
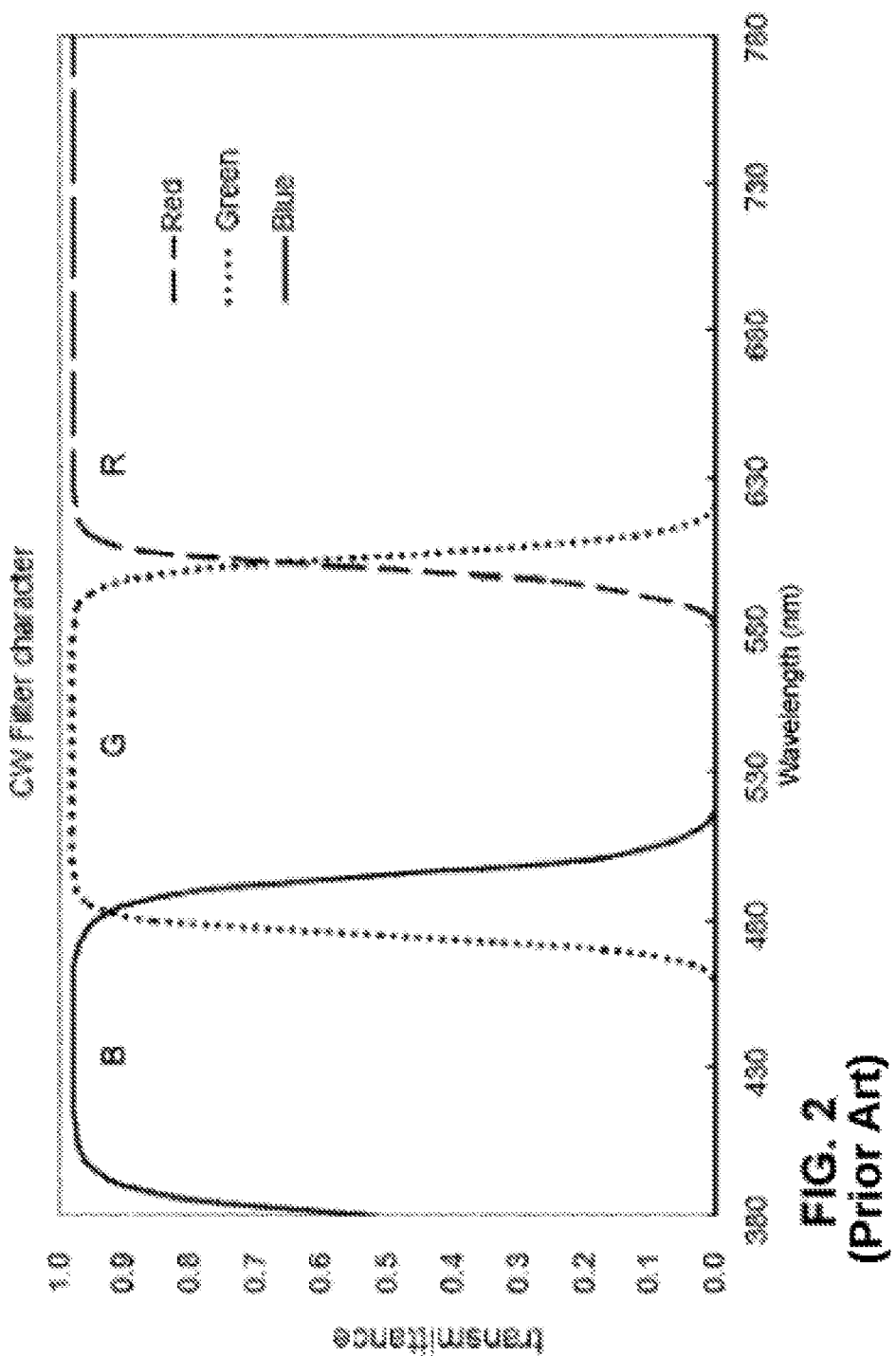
FIG. 2 shows the RGB color filter spectrum of the color wheel of FIG. 1A.

The typical color filter spectrum for an RGB color wheel is shown in FIG. 2. As seen here, the transmittance over the entire spectrum is very high (close to 1.0) due to the combination of the three color segments.

A phosphor wheel is used to generate light of different colors sequentially. Light conversion (or wavelength conversion) materials such as phosphors are used on the phosphor wheel. The phosphor wheel normally has some fan segments which contain different types of phosphor to convert the excitation light to a green, yellow, or red color. Typically, a blue light laser (having a wavelength of about 440 nm to about 460 nm) is used to excite the phosphor segments on the phosphor wheel. The phosphor wheel can also have one or more gaps to pass the blue source light through unconverted. Phosphor wheels have two basic structures: reflective and transmissive.

Figure 3B:
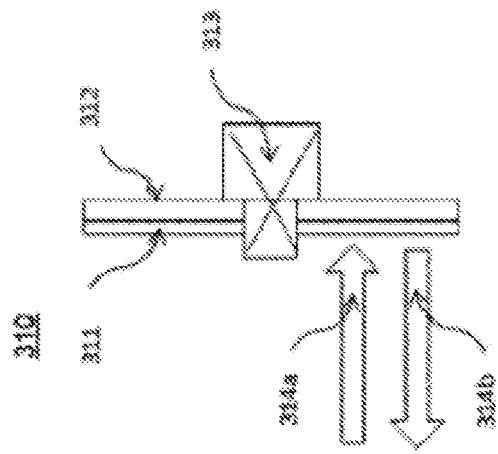
FIG. 3B is a side view showing the optical path therethrough.
Figure 3A:
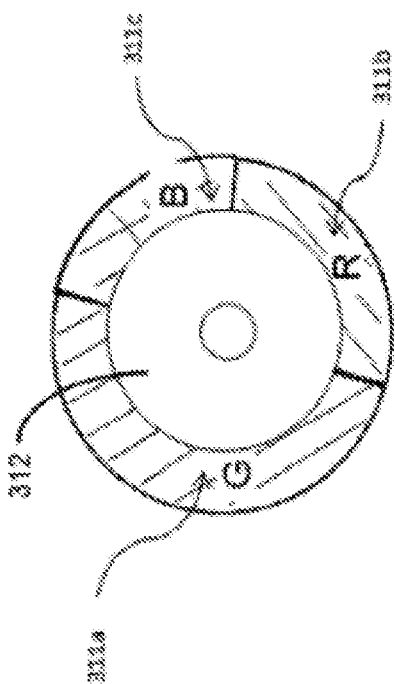
FIG. 3A is a plan view of a conventional reflective phosphor wheel.

In a reflective phosphor wheel, the excitation light of the blue light laser does not pass through the substrate before stimulating the phosphors. FIG. 3A and FIG. 3B show the typical structure of a reflective phosphor wheel. Phosphor powder is mixed with a binder to make a phosphor mixture that is deposited on a substrate 312, which is generally a metal substrate (e.g., aluminum) coated by a highly reflective film. After curing at a specified or desired temperature, the phosphor layer 311 is tightly bonded to the substrate. As illustrated in FIG. 3A, the phosphor layer has three segments: a green segment 311a, a red segment 311b, and a blue segment 311c to achieve the RGB light. These three segments are located on the perimeter of the circular (from the plan view) substrate 312. It is noted that the blue segment does not contain phosphor powder (because the excitation light is typically blue light), but rather contains a diffuser instead. This reduces speckle. The portion of the substrate 312 on which the red segment and the green segment are located is highly reflective. The portion of the substrate on which the blue segment is located is either made from a different material than the rest of the substrate or includes a slot through the substrate, with the different material/slot permitting the blue light to pass through the wheel instead of being reflected. As illustrated in FIG. 3B, the substrate 312 is then mounted to the motor 313 to obtain a phosphor wheel 310.

As illustrated in FIG. 3B, excitation blue light 314a stimulates the red and green phosphors 311, and the emission light 314b is reflected by the substrate 312 and then collected by the subsequent optical system. In this way, the excitation light does not pass through the substrate 312 to stimulate the phosphors to obtain the emitted light. The red and green emitted light do not pass through the substrate 312. The blue light, however, does pass through the substrate (made of a different non-reflective material or contains a slot).

Figure 4:
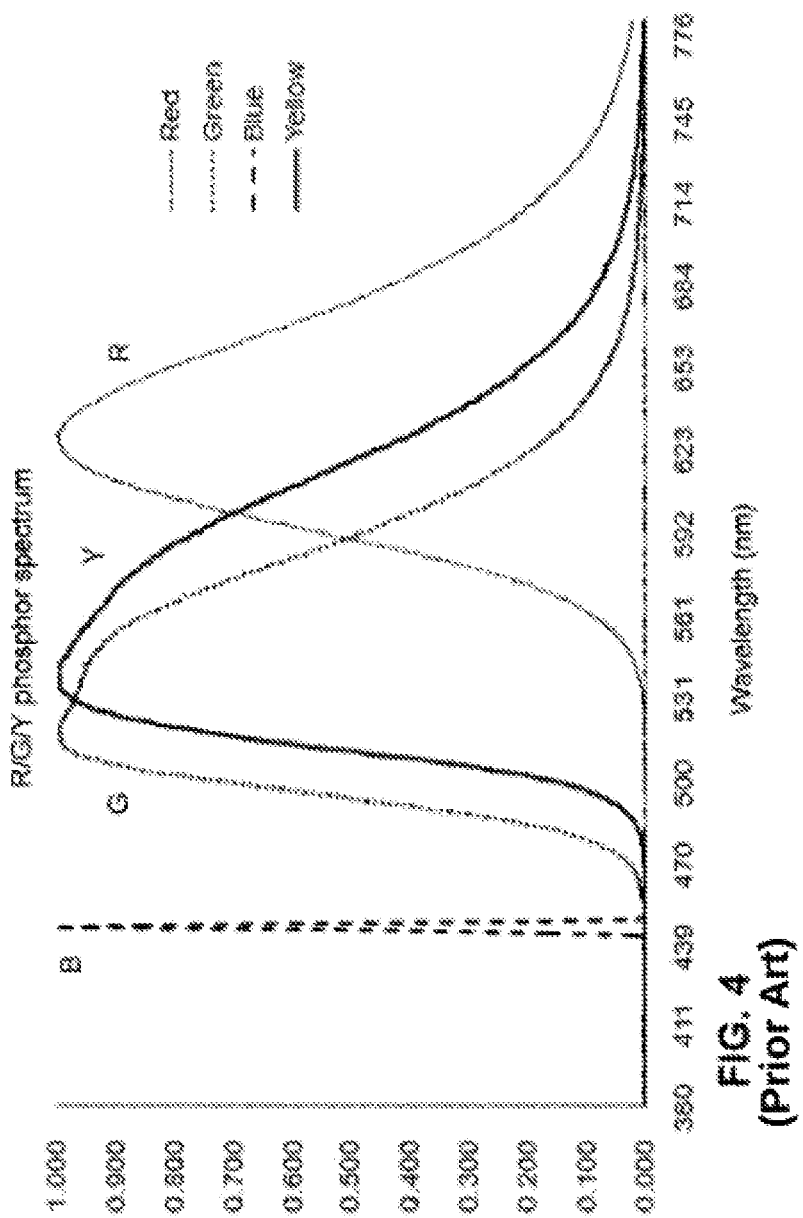
FIG. 4 shows the R/G/Y phosphor and blue laser color spectrum. The y-axis is transmittance, and the x-axis is wavelength in nanometers.

Because red phosphor has a relatively low conversion efficiency, sometimes yellow phosphor is used instead of red phosphor, and the red color is extracted from the yellow spectrum. FIG. 4 shows the typical color spectrum for R/G/Y phosphors and the blue laser. As seen here, the blue laser transmits sharply between 440 nm and 460 nm. The green (G) phosphor is on the left, then the yellow (Y) phosphor in the center, and the red (R) phosphor on the right. The Y and R phosphors have significant overlap starting at about 622 nm.

Figures 5A, 5B:
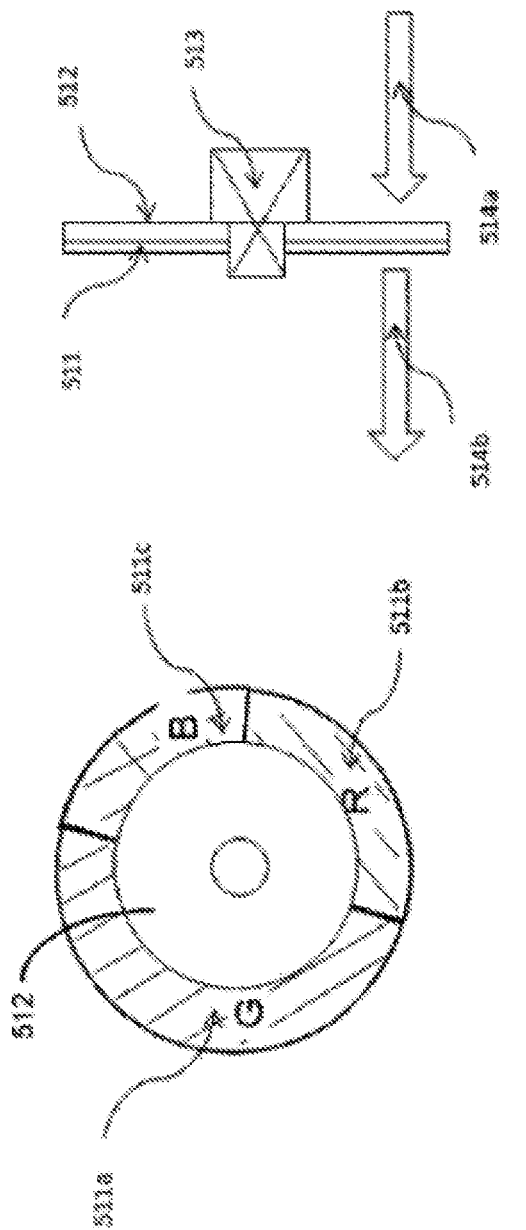
FIG. 5A is a plan view of a conventional transmissive phosphor wheel.
FIG. 5B is a side view showing the optical path therethrough.

The second type of phosphor wheel is a transmissive phosphor wheel. In a transmissive phosphor wheel, the excitation light passes through the substrate before stimulating the phosphors. FIG. 5A and FIG. 5B show the typical transmissive phosphor wheel structure. Again, phosphor powder is mixed with a binder to make a phosphor mixture that is deposited on a substrate 512. As illustrated here, the phosphor layer 511 has three segments: a green segment 511*a*, a red segment 511*b*, and a blue segment 511*c*. Instead of a reflective substrate, though, in a transmissive phosphor wheel the entire substrate 512 is a transparent substrate that is coated with a blue dichroic film. Generally, glass or sapphire is used as the substrate material. Blue light can pass through the substrate, while the red, green, and yellow (RGY) light emitted by the phosphor is reflected.

As illustrated in FIG. 5B, excitation blue light 514*a* first passes through the substrate (i.e. is transmitted from the backside of the phosphor wheel) and then stimulates the phosphors 511. The emission light 514*b* is collected by the subsequent optical system.

Figure 6:
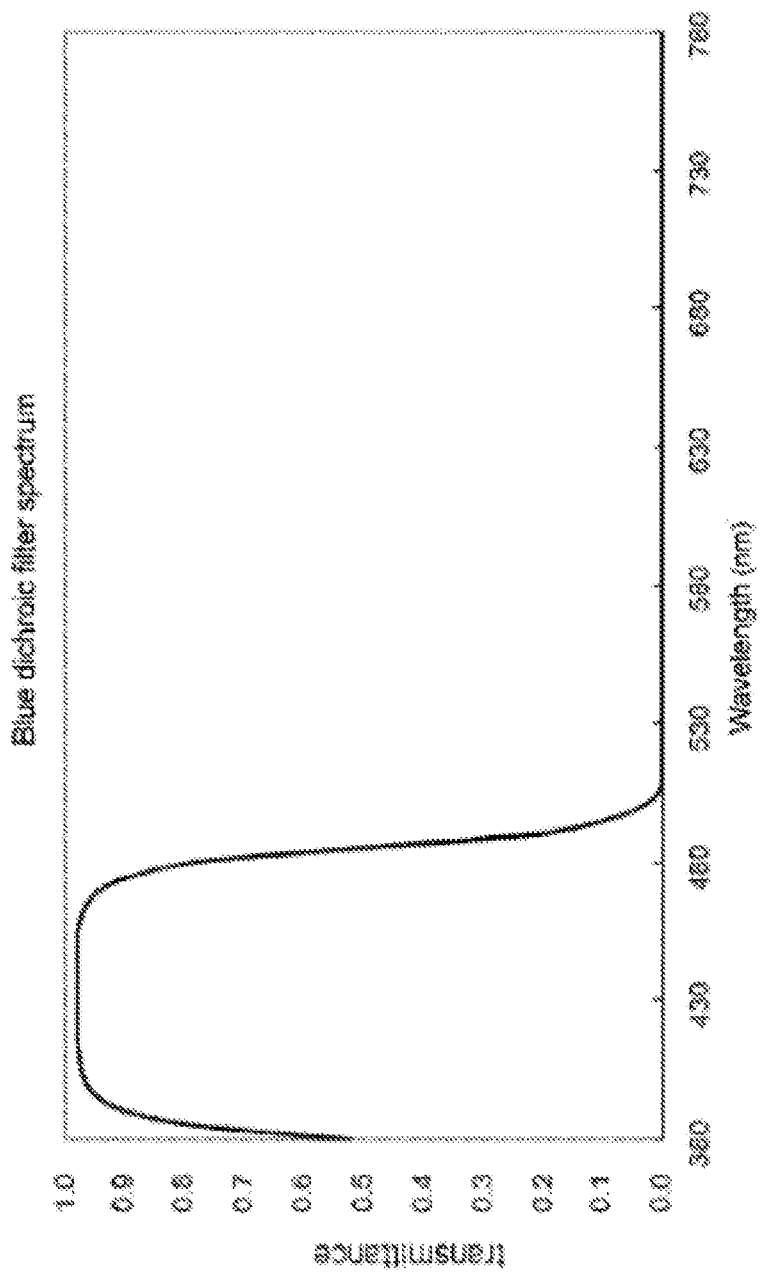
FIG. 6 shows the color spectrum of a blue dichroic filter. The y-axis is transmittance, and the x-axis is wavelength in nanometers.

FIG. 6 shows the typical spectrum of the substrate used in a transmissive phosphor wheel. The substrate acts as a blue dichroic filter, and permits only blue light to be transmitted (i.e. to pass through).

Figure 7:
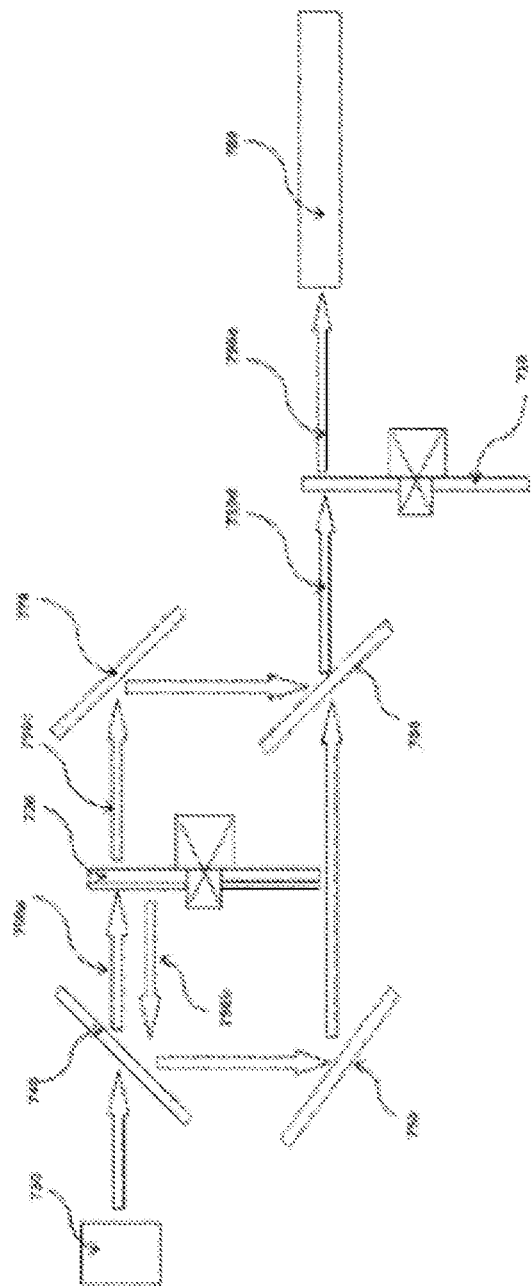
FIG. 7 shows the optical path through an applied optical system including a reflective phosphor wheel and a separate color wheel.

FIG. 7 shows a typical optical path that is needed when using both a reflective phosphor wheel (see FIG. 5A) and a separate color wheel. A blue laser generator 730 produces blue laser light that passes through a blue dichroic filter 740. The excitation blue light 790*a* stimulates the phosphor on the reflective phosphor wheel 720. Red/green/yellow (RGY) light 790*b* is reflected by the reflective portion of the substrate of the reflective phosphor wheel 720 back towards blue dichroic filter 740, where it is reflected towards mirror 750. Mirror 750 redirects the RGY light towards a second dichroic filter 760. Dichroic filter 760 has an inverse spectrum compared with dichroic filter 740. Put another way, blue light is reflected, and other colors are transmitted (i.e. pass through the filter). The RGY light passes through the second dichroic filter 760, as indicated by reference numeral 790*d*, and through a color wheel 710, which tunes the colored light. The tuned color light 790*e* is then collected by a subsequent optical system 780. The blue emission light passes through the phosphor wheel, as indicated by reference numeral 790*c* (because the different material or slot used for this portion of the substrate or the slot in the substrate permits the blue light to pass through). The blue light is redirected by a mirror 770 towards the second dichroic filter 760, which then reflects the blue light towards the optical system 780.

Figure 8:
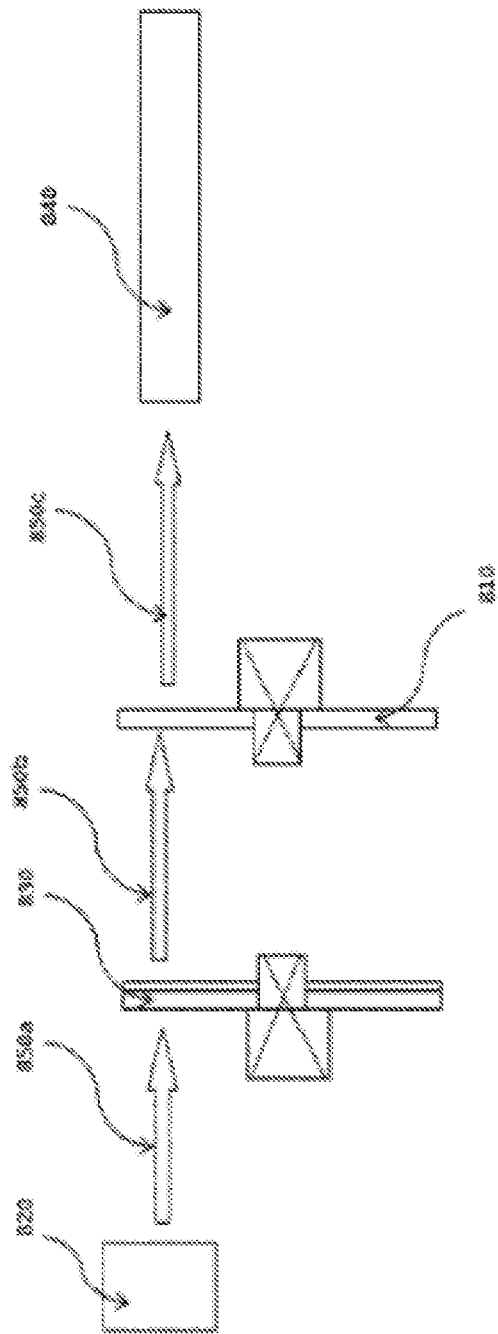
FIG. 8 shows the optical path through an applied optical system including a transmissive phosphor wheel and a separate color wheel.

FIG. 8 shows the typical optical path using a transmissive phosphor wheel and a separate color wheel. The blue laser generator 820 produces blue laser light 850*a*, which passes through the substrate of the transmissive phosphor wheel 830, thereby stimulating the phosphor powder to produce RGY emission light 850*b*. The RGY emission light 850*b* then passes through color wheel 810, which tunes the light. The tuned color light 850*c* is then collected by a subsequent optical system 840. This system is much simpler than that of FIG. 7, and does not need additional dichroic filters or mirrors.

A sandwich structure has been created to integrate a transmissive phosphor wheel and a color wheel into a single wheel. FIG. 9A and FIG. 9B show a combination wheel having this sandwich structure. In this sandwich structure, as seen in FIG. 9B, the phosphor layer 911 is sandwiched between the substrate 912 and the color filter 915. As seen in FIG. 9A, the phosphor layer is illustrated with three different color segments (R, G, B) on the perimeter of the substrate 912. The color filter is made up of three different segments 915*a*, 915*b*, 915*c* as well, with the color filter corresponding to the phosphor color. Here, for example, a red color filter is on top of the red phosphor segment. The color filter is then attached to the motor 913.

Referring back to FIG. 9B, excitation blue light 914*a* passes through the substrate 912 to stimulate the phosphor layer 911. The emission light from the phosphor then passes through the color filter 915 and is immediately tuned. The tuned color light 914*b* can then be collected.

The color filter of the sandwich structure and the separate color wheel generally have the same spectrum demand. Their only difference is in the angle of incidence. For an independent color wheel, the AOI can be small, generally less than 30°. In the sandwich structure, however, the AOI is more than 45° and is generally designed having as AOI of 60°. This is because the emission light of phosphor has a Lambertian distribution (i.e. defined by Lambert's cosine law), which means that 80% of the light energy is concentrated in a +/−60° range. To collect as much emission light as much as possible, the AOI of the incident light of the color filter of the sandwich structure needs to be as large as possible (due to the smaller distance between the phosphor and the color filter).

Figure 10:
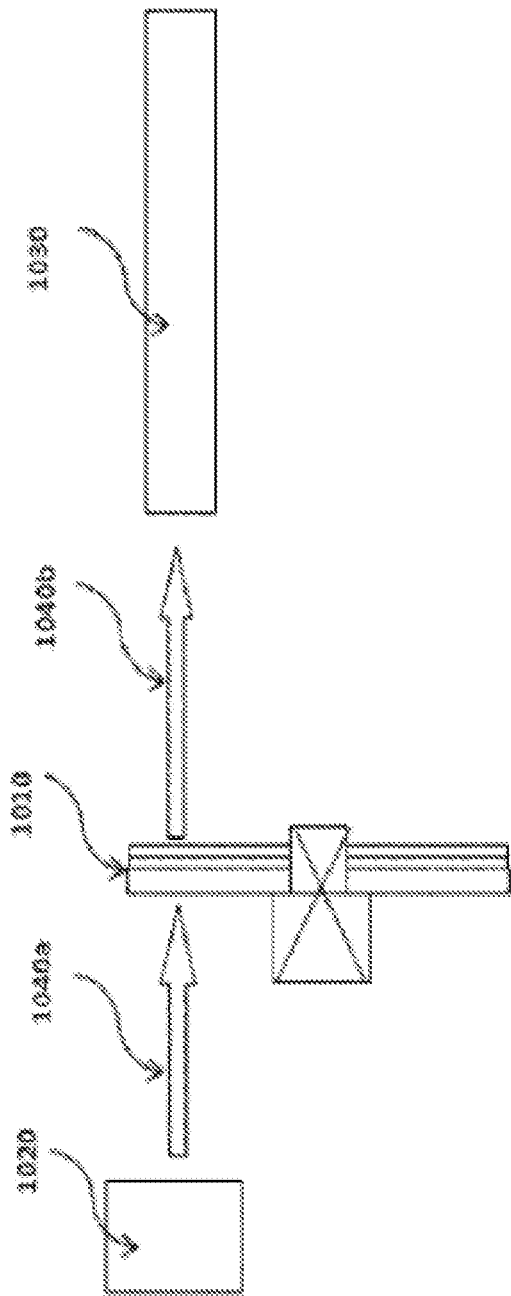
FIG. 10 shows the optical path through an applied optical system including the sandwich-structure combination wheel of FIG. 9.

FIG. 10 shows the typical optical path using a sandwich-structure combination wheel. This optical path is very similar to that of FIG. 8, but no separate color wheel is present. Here, a blue laser generator 1020 produces 440~460 nm blue laser light 1040*a* that passes through the sandwich-structure combination wheel 1010, stimulating the phosphor powder and passing through the color filter to tune the emitted light. The tuned color light 1040*b* is then collected by a subsequent optical system 1030.

Transmissive phosphor wheels have simpler optical paths, require a smaller quantity of optical parts, and are typically producible in a smaller, lighter, and cheaper package. However, transmissive phosphor wheels have distinct disadvantages, such as lower thermal dissipation efficiency and lower brightness (generally not more than 2000 ANSI in projector applications). As such, transmissive phosphor wheels only have about 70-80% of the conversion efficiency of reflective phosphor wheels, making them useful only in low-end SSI projectors.

Reflective phosphor wheels generally adopt aluminum as the substrate material, which is coated with a high reflection film. More than 95% emission light has been reflected. Because aluminum substrates have high thermal conductivity (more than 220 W/m·k), reflective phosphor wheels have better thermal dissipation efficiency. They are therefore suitable for high-end SSI projectors capable of achieving 10,000 ANSI. Reflective phosphor wheels, however, possess other intrinsic defects, such as complex optical path structures, which require more optical parts, and typically fit only in larger and heavier packages. A separate color wheel is also needed to achieve necessary color tuning for projector applications.

The present disclosure relates to combination wheels that integrate a reflective phosphor wheel and a color wheel. At least three different embodiments are contemplated, as illustrated in FIGS. 11A-13B.

FIG. 11A and FIG. 11B illustrate a dual-substrate structure. FIG. 11A is a plan view, and FIG. 11B is a side cross-sectional view. The color filter 1115 is segmented into at least three different colors (here RGB). As seen in FIG. 11A, the three segments 1115*a*, 1115*b*, 1115*c* can have any central angle. Here, the G segment 1115*a* has a central angle of 180°, while the R segment 1115*b* and the B segment 1115*c* each have a central angle of 90°. The R segment acts as a red dichroic filter that passes red light, the G segment acts as a green dichroic filter that passes green light, and the B segment acts as a blue dichroic filter that passes blue light (other colors reflected).

The reflective substrate 1112 is coaxially aligned with the color filter 1115, and is located on a first surface 1116 of the color filter. The reflective substrate is in the shape of a cylinder with a wedge removed, or put another way has a central angle of less than 360°. As seen in FIG. 11A, the reflective substrate 1112 has a central angle of 270°. Two light-emitting phosphor segments 1111a, 1111b are present on the perimeter of the reflective substrate (which is different from the perimeter of the color filter). The G phosphor segment 1111a is radially aligned with the G color filter segment 1115a, and the R phosphor segment 1111b is radially aligned with the R color filter segment 1115b. Here, the reflective substrate 1112 is formed from a highly reflective metal (e.g. aluminum) or a metal with a high reflection film formed thereon. The reflective substrate can be made, for example, by stamping or punching. It should be noted that the radius of the color filter 1115 is greater than the radius of the reflective substrate 1112. For example, the radius of the color filter can be about 25 millimeters (mm), while the radius of the reflective substrate is about 15 mm.

A diffuser segment 1118 is located adjacent the reflective substrate 1112 on the first surface 1116 of the color filter. The diffuser segment could be described as filling the wedge that was removed from the reflective substrate. As seen in FIG. 11A, the diffuser segment 1118 is radially aligned with the B color filter segment 1115c. The diffuser 1118 can, for example, be made of glass or sapphire, with the diffuser pattern being achieved by etching and compression moulding. The diffuser segment and the reflective substrate may be of the same thickness. The color filter 1115, the reflective substrate 1112, and the diffuser segment 1118 are then mounted onto the motor 1113.

As illustrated in FIG. 11B, excitation blue light 1114a stimulates the phosphor segments 1111. The emission light 1114b from the phosphors is reflected by the reflective substrate, then reflected by other optics (not shown) to pass through the color filter 1115. The tuned color light 1114c is then collected by the subsequent optical system. Blue light passes through the diffuser segment 1118 and then directly through the blue color filter segment 1115c, without being reflected by other optics. It should be noted here, that the blue light is aimed at the reflective substrate in the central portion of the combination wheel, rather than at the perimeter of the phosphor wheel as in FIG. 7.

The embodiment of FIG. 11 uses a dual-substrate structure. The two substrates are the color filter and the reflective substrate, with the reflective substrate being used to carry the phosphor powder. This structure leads to a higher motor loading and more complex installation. Generally, the reflective substrate is made of a different material from the color filter and the diffuser segment. The reflective substrate can be made from a metal/metal alloy, but could also be a ceramic, sapphire, or similar material. The diffuser and the color filter are generally a glass material, but could also be made from a ceramic, sapphire, or similar material.

Figures 12A, 12B:
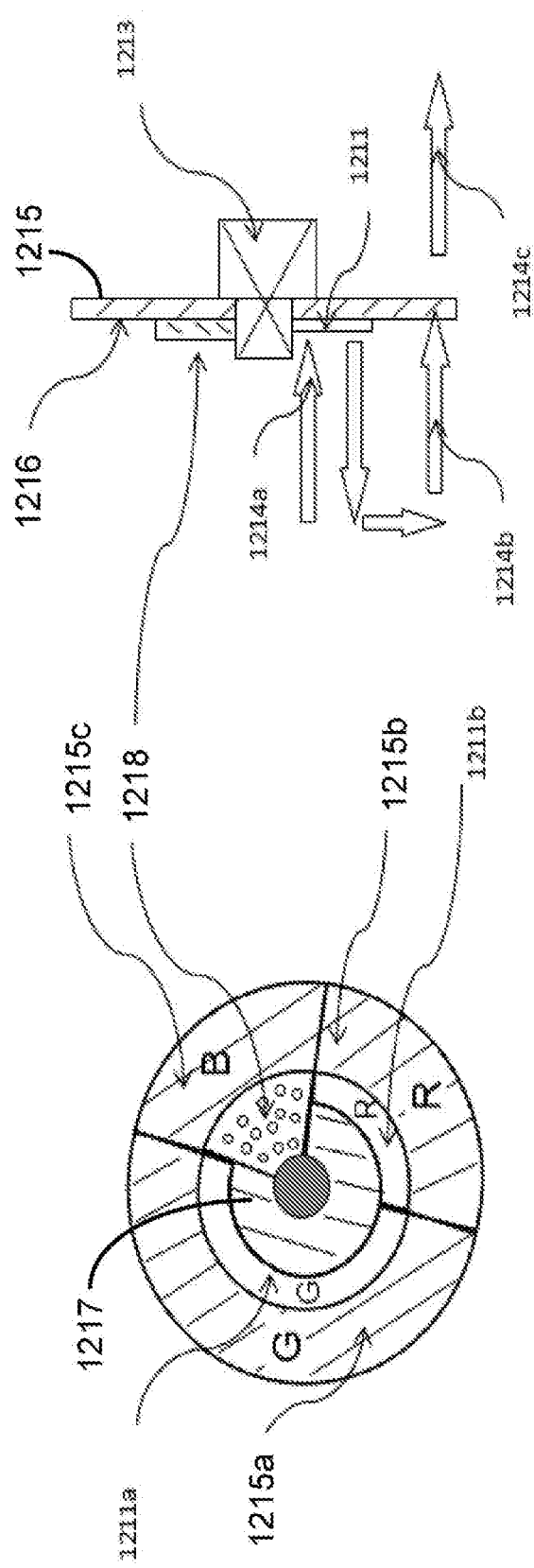
FIG. 12A is a plan view of a second exemplary embodiment of a combination wheel of the present disclosure. This embodiment is a single-substrate structure.
FIG. 12B is a side cross-sectional view of the combination wheel, and also illustrates the optical path therethrough.

FIG. 12A and FIG. 12B illustrate a single-substrate structure, which is relatively similar to the dual-substrate structure. The color filter 1215 is segmented into at least three different colors (here RGB). As seen in FIG. 12A, the three segments 1215a, 1215b, 1215c can have any central angle. Here, the G segment 1215a has a central angle of 180°, while the R segment 1215b and the B segment 1215c each have a central angle of 90°.

In this single-substrate structure, there is no additional reflective substrate. Instead, the central portion 1217 of the color filter acts as a color tuner for the blue light. Two light-emitting phosphor segments 1211a, 1211b are then present on the central portion 1217. A highly reflective material is coated on the central portion underneath the phosphor segments. The G phosphor segment 1211a is radially aligned with the G color filter segment 1215a, and the R phosphor segment 1211b is radially aligned with the R color filter segment 1215b.

A diffuser segment 1218 is located on the first surface 1216 of the color filter. The diffuser segment 1218 is radially aligned with the B color filter segment 1215c.

As illustrated in FIG. 12B, excitation blue light 1214a stimulates the phosphor segments 1211. The emission light 1214b from the phosphors is reflected by the highly reflective material, then reflected by other optics (not shown) to pass through the color filter 1215. The tuned color light 1214c is then collected by the subsequent optical system. Blue light passes through the diffuser segment 1218 and then directly through the blue color filter segment 1215c, without being reflected by other optics.

Figures 13A, 13B:
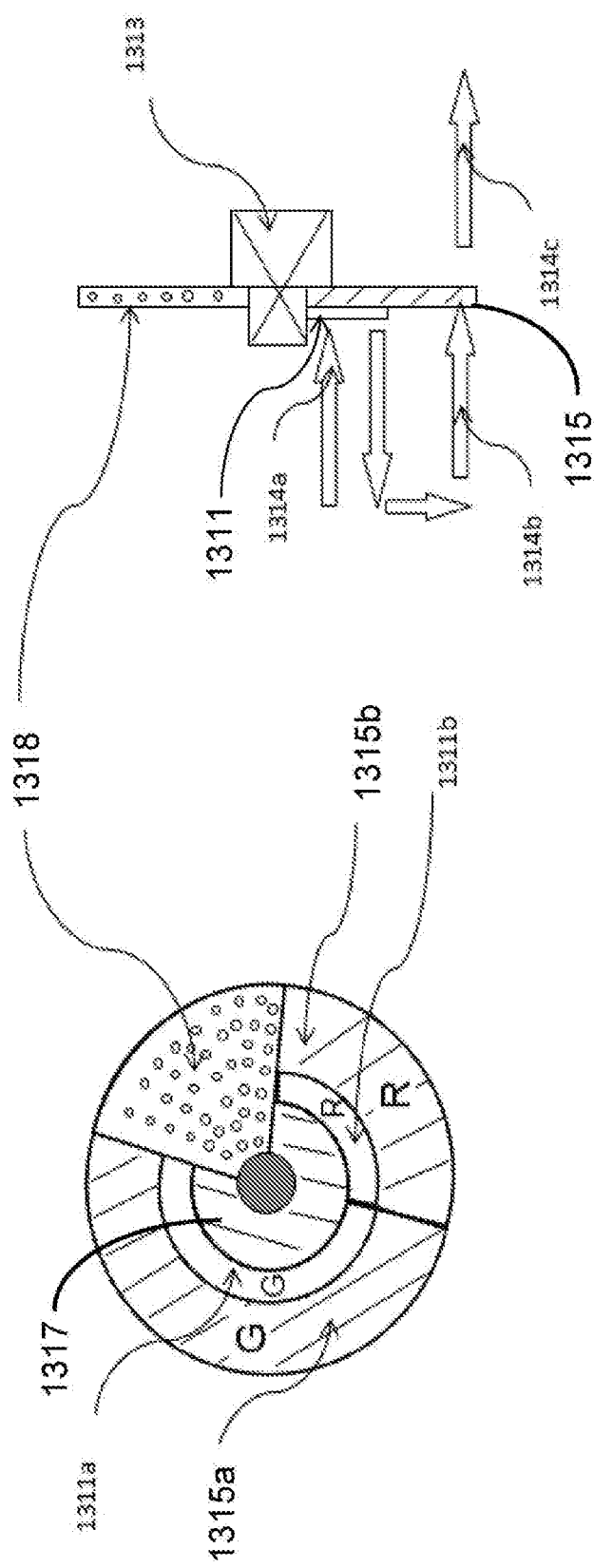
FIG. 13A is a plan view of a third exemplary embodiment of a combination wheel of the present disclosure. This embodiment has a thinner structure.
FIG. 13B is a side cross-sectional view of the combination wheel, and also illustrates the optical path therethrough.

To further reduce the thickness, the single-substrate embodiment of FIGS. 12A-12B can be modified, as shown in FIG. 13A and FIG. 13B. Here, the diffuser segment 1318 replaces the blue color filter segment entirely, which reduces the thickness. The thinner single-substrate embodiment of FIGS. 13A-13B is otherwise identical to the single-substrate embodiment of FIG. 12.

The color filter 1315 is segmented into at least two different colors (here RG). The overall color filter 1315 has a central angle of less than 360° (with the remainder being filled in by the diffuser segment 1318). As seen in FIG. 13A, the G segment 1315a has a central angle of 180°, while the R segment 1315b has a central angle of 90°.

The central portion 1317 of the color filter acts as a reflector. Two light-emitting phosphor segments 1311a, 1311b are then present on the central portion 1317. A highly reflective material is coated on the central portion underneath the phosphor segments. The G phosphor segment 1311a is radially aligned with the G color filter segment 1315a, and the R phosphor segment 1311b is radially aligned with the R color filter segment 1315b.

The diffuser segment 1318 is located adjacent the color filter 1315. The radius of the diffuser segment is equal to the radius of the color filter 1315. The blue light will be tuned by subsequent optical parts.

As illustrated in FIG. 13B, excitation blue light 1314a stimulates the phosphor segments 1311. The emission light 1314b from the phosphors is reflected by the highly reflective material located between the phosphor segments and the color filter, then reflected by other optics (not shown) to pass through the color filter 1315. The tuned color light 1314c is then collected by the subsequent optical system. Blue light passes through the diffuser segment 1318 and then directly through the blue color filter segment 1315c, without being reflected by other optics.

Figure 14:
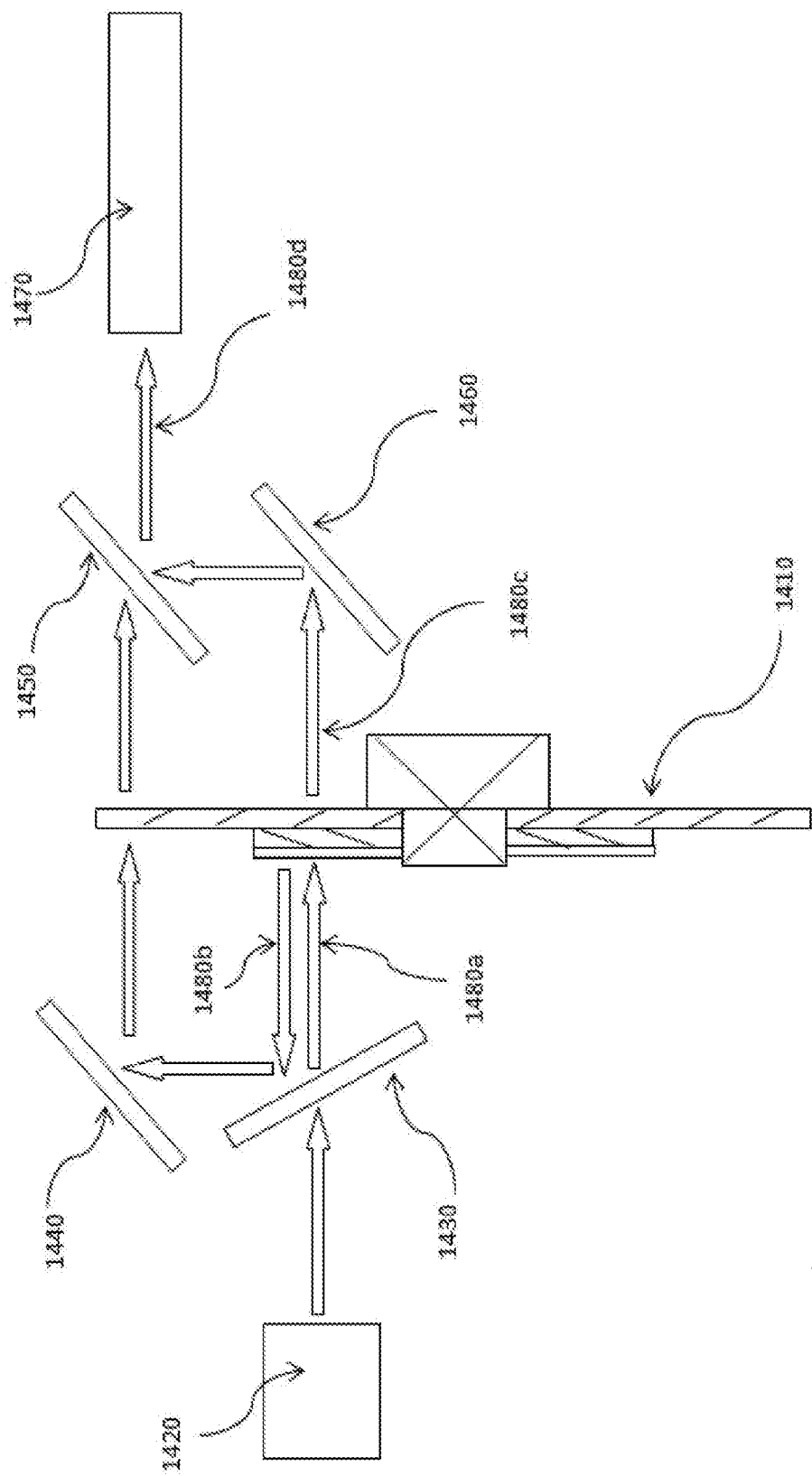
FIG. 14 shows the optical path through an applied optical system including the dual-substrate structure of FIG. 11A.

FIG. 14 illustrates the optical path through an applied optical system including the dual-substrate structure of FIGS. 11A-11B. A blue laser generator 1420 produces a 440~460 nm blue laser light that passes through a first blue dichroic filter 1430. The blue dichroic filter 1430 passes blue light through, and reflects other colors. After passing through the first blue dichroic filter 1430, the blue light 1480a stimulates the phosphors on the combination wheel 1410. RGY emission light 1480b is reflected by the reflective substrate of the combination phosphor/color wheel 1410 back towards the first blue dichroic filter. The RGY light 1480b (i.e. other than blue color) is reflected by the dichroic filter 1430, and redirected again by a mirror 1440 toward the color filter of the combination wheel 1410. The RGY light is tuned by the combination wheel 1410. The tuned color light then passes through a second dichroic filter 1450. Dichroic filter 1450 has an inverse spectrum compared with dichroic filter 1440, or in other words passes other-color (e.g. RGY) light and reflects blue light. The RGY light passes through the second dichroic filter 1450. The tuned RGY light 1480d is then collected by a subsequent optical system 1470. The blue light 1480c that has passed through the diffuser and the blue dichroic color filter segment of the combination wheel 1410 is redirected by a second mirror 1460 towards the second dichroic filter 1450, which reflects the blue light to the optical system 1470.

The optical path through an applied optical system using the combination wheels of FIGS. 12A-12B and FIGS. 13A-13B would be substantially similar to that depicted in FIG. 14. However, for the combination wheel of FIGS. 13A-13B, the blue light could be tuned by subsequent optical parts to obtain tuned blue light, for example by a dichroic film coating.

Figure 15:
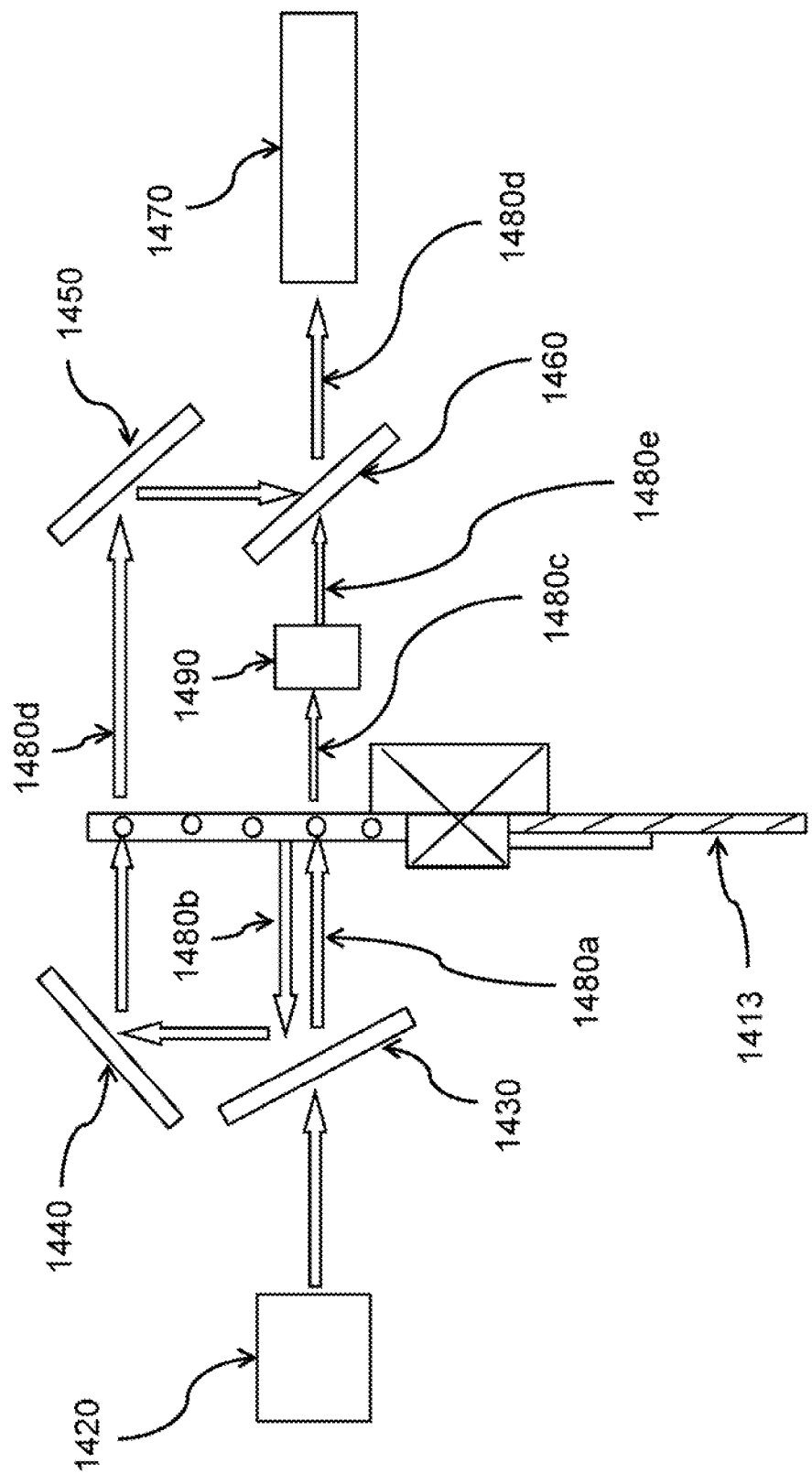
FIG. 15 shows the optical path through an applied optical system including the structure of FIG. 13A.

In FIG. 14, the optical system 1470 is aligned with the RGY light 1480b. The optical system 1470 could be aligned instead with the blue light 1480a, as illustrated in FIG. 15. Also, in FIG. 15, the combination wheel 1413 of FIG. 13A is used instead. With the combination wheel 1413, blue light 1480a passes through the diffuser segment and remains untuned. The untuned blue light 1480c passes through blue color filter 1490, and the tuned blue light 1480e then passes through second blue dichroic filter 1460, which passes the tuned blue light through to optical system 1470. The RGY light 1480b emitted by the phosphors is reflected by first blue dichroic filter 1430, then redirected by first mirror 1440 to pass through the color filter and become tuned other-color (e.g. RGY) light 1480d. The tuned other-color light is then redirected by second mirror 1450 to second blue dichroic filter 1460 which reflects the tuned other-color light 1480d towards the optical system 1470.

These combination phosphor/color wheels are used to convert excitation light from blue light to another color. For example, the combination phosphor/color wheels may convert blue light to yellow or green light, particularly in laser projection display systems.

The present disclosure has been described with reference to preferred embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A combination wheel, comprising:
a substrate that is a color filter segmented into at least three different colors;
a reflective coating coaxially aligned with the color filter, the reflective coating being coated on a central area of a first surface of the color filter and having a central angle of less than 360° with a portion of uncoated central area of the first surface of the color filter;
a first light-emitting phosphor segment deposited on a first sector of the reflective coating;
a second light-emitting phosphor segment deposited on a second sector of the reflective coating; and
a diffuser segment located adjacent the reflective coating, the diffuser segment being disposed on the portion of uncoated central area of the first surface of the color filter, the diffuser segment being transmissive for blue light;
wherein the combination wheel is a single-substrate structure with no additional substrate that is reflective or that includes a reflective coating thereon.

2. The combination wheel of claim 1, wherein the first light-emitting phosphor segment includes a green light-emitting phosphor; and the second light-emitting phosphor segment includes a red or yellow light-emitting phosphor.

3. The combination wheel of claim 2, wherein the first light-emitting phosphor segment is radially aligned with a green segment of the color filter; the second light-emitting phosphor segment is radially aligned with a red or yellow segment of the color filter, and the diffuser segment is radially aligned with a blue segment of the color filter.

4. The combination wheel of claim 1, wherein the reflective coating is a reflective metal.

5. The combination wheel of claim 4, wherein the reflective coating is composed of aluminum or an aluminum alloy.

6. The combination wheel of claim 1, wherein the color filter comprises a glass substrate.

7. The combination wheel of claim 1, further comprising a hub coupled to a motor, the color filter being coupled to the hub.

8. An apparatus, comprising:
the combination wheel of claim 1;
a blue laser generator that (A) produces an excitation blue light and (B) is aligned with the reflective coating and the diffuser segment;
a first dichroic filter located between the blue laser generator and the combination wheel, wherein blue light passes through the first dichroic filter and other-color light is reflected by the first dichroic filter;
a first mirror located to redirect the other-color light from the first dichroic filter toward the color filter of the combination wheel, such that the other-color light passes through the color filter of the combination wheel and is tuned to produce tuned other-color light; and
an optical system aligned to receive the tuned other-color light.

9. The apparatus of claim 8, further comprising:
a second dichroic filter located between the combination wheel and the optical system, wherein the tuned other-color light passes through the second dichroic filter and blue light is reflected by the second dichroic filter; and
a second mirror located to redirect blue light that passes through the diffuser segment of the combination wheel toward the second dichroic filter, so that the blue light is again reflected by the second dichroic filter toward the optical system.

10. The apparatus of claim 8, further comprising:
a second dichroic filter located between the combination wheel and the optical system, wherein blue light passes through the second dichroic filter and other-color light is reflected by the second dichroic filter; and
a second mirror located to redirect the tuned other-color light toward the second dichroic filter, so that the tuned other-color light is again reflected by the second dichroic filter toward the optical system.

11. The combination wheel of claim 1, wherein:
the first surface comprises a first planar surface; and
the color filter comprises a second planar surface that opposes the first planar surface,
wherein the first and second planar surfaces are mutually parallel throughout the color filter.

12. A combination wheel, comprising:
a substrate that is a color filter segmented into at least two segments of different colors and having a central angle of less than 360° whereby the color filter has a missing segment;
a reflective coating coaxially aligned with the color filter, the reflective coating being coated on a central area of a first surface of the color filter and having a central angle of less than 360° based at least upon the color filter having the missing segment;
a first light-emitting phosphor segment deposited on a first sector of the reflective coating;
a second light-emitting phosphor segment deposited on a second sector of the reflective coating; and
a diffuser segment located adjacent the color filter and having a radius equal to a radius of the color filter, the diffuser segment replacing the missing segment of the color filter, the diffuser segment being transmissive for blue light;
wherein the combination wheel is a single-substrate structure with no additional substrate that is reflective or that includes a reflective coating thereon.

13. The combination wheel of claim 12, wherein the first light-emitting phosphor segment includes a green light-emitting phosphor; and the second light-emitting phosphor segment includes a red or yellow light-emitting phosphor.

14. The combination wheel of claim 13, wherein the first light-emitting phosphor segment is radially aligned with a green segment of the color filter; and the second light-emitting phosphor segment is radially aligned with a red or yellow segment of the color filter.

15. The combination wheel of claim 12, wherein the color filter is segmented into a green segment and a red or yellow segment.

16. The combination wheel of claim 12, wherein the color filter comprises a glass substrate.

17. An apparatus, comprising:
the combination wheel of claim 12;
a blue laser generator that (A) produces an excitation blue light and (B) is aligned with the reflective coating and the diffuser segment;
a first dichroic filter located between the blue laser generator and the combination wheel, wherein blue light passes through the first dichroic filter and other-color light is reflected by the first dichroic filter;
a first mirror located to redirect the other-color light from the first dichroic filter toward the color filter of the combination wheel, such that the other-color light passes through the color filter of the combination wheel and is tuned to produce tuned other-color light; and
an optical system aligned to receive the tuned other-color light.

18. The apparatus of claim 17, further comprising:
a blue color filter for tuning the excitation blue light to produce tuned blue light wherein the blue color filter is separate from the combination wheel.

19. The apparatus of claim 18, further comprising:
a second dichroic filter located between the combination wheel and the optical system; and
a second mirror;
wherein the second dichroic filter and the second mirror are configured so that the tuned other-color light and the tuned blue light are directed toward the optical system.

20. The combination wheel of claim 12, wherein the diffuser segment replacing the missing segment of the color filter extends between an inner perimeter of the color filter and an outer perimeter of the color filter, the diffuser segment having radius equal to a radius of the substrate.

* * * * *